US011483425B2

(12) United States Patent
Garbin et al.

(10) Patent No.: US 11,483,425 B2
(45) Date of Patent: *Oct. 25, 2022

(54) METHOD, DEVICE, AND SYSTEM FOR PROVIDING PRIVACY FOR COMMUNICATIONS

(71) Applicant: RingCentral, Inc., Belmont, CA (US)

(72) Inventors: Christian Garbin, Boca Raton, FL (US); Johannes Ruetschi, Boca Raton, FL (US)

(73) Assignee: RINGCENTRAL, INC., Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,866

(22) Filed: Oct. 23, 2018

(65) Prior Publication Data

US 2019/0058679 A1     Feb. 21, 2019

Related U.S. Application Data

(63) Continuation of application No. 14/640,554, filed on Mar. 6, 2015, now Pat. No. 10,142,271.

(51) Int. Cl.
*H04M 1/7243* (2021.01)
*H04W 12/02* (2009.01)
(Continued)

(52) U.S. Cl.
CPC .......... *H04M 1/7243* (2021.01); *H04L 51/04* (2013.01); *H04L 51/063* (2013.01);
(Continued)

(58) Field of Classification Search
CPC ....... H04L 51/12; H04L 51/04; H04L 51/063; H04M 1/72547; H04W 12/02; G10L 13/00
(Continued)

(56) References Cited

U.S. PATENT DOCUMENTS 5,224,151 A      6/1993   Bowen et al.
6,968,179 B1    11/2005   De Vries
(Continued)

FOREIGN PATENT DOCUMENTS

CN       1722048 A     1/2006
CN     104025608 A     9/2014
(Continued)

*Primary Examiner* — Tan Doan
(74) *Attorney, Agent, or Firm* — Finnegan, Henderson, Farabow, Garrett & Dunner LLP

(57) ABSTRACT

A communication system, method and communication terminal are configured to facilitate private outputting of content of a message or communication session. A communication terminal can be configured via data included in a message or via a privacy setting to output content of data from a communication session or message in accordance with a pre-selected privacy setting or one or more privacy rules. For instance, a communication terminal may be configured to suppress a text to speech function for certain text messages, email messages, instant messages, or social networking messages that it receives having the privacy parameter set therein. As another example, a user may set the privacy parameter in his or her terminal so that any such message received by that terminal is output in accordance with the privacy setting or rules. A detection of nearby people can affect how certain content may be output via a terminal.

20 Claims, 3 Drawing Sheets

(51) Int. Cl.
*H04L 51/212* (2022.01)
*H04L 51/04* (2022.01)
*H04L 51/063* (2022.01)
*G10L 13/00* (2006.01)
*H04M 1/67* (2006.01)

(52) U.S. Cl.
CPC ........... *H04L 51/212* (2022.05); *H04W 12/02* (2013.01); *G10L 13/00* (2013.01); *H04M 1/67* (2013.01)

(58) Field of Classification Search
USPC ........................................................ 709/206
See application file for complete search history.

(56) References Cited

U.S. PATENT DOCUMENTS

| | | | |
|---|---|---|---|
| 7,187,764 B2 | 5/2007 | Ruetschi | |
| 7,418,084 B2 | 3/2008 | Ruetschi et al. | |
| 7,672,436 B1 | 3/2010 | Thenthiruperai et al. | |
| 7,885,901 B2 | 2/2011 | Hull et al. | |
| 8,169,949 B1 | 5/2012 | Sankaranaraynan et al. | |
| 8,184,796 B2 | 5/2012 | Ruetschi et al. | |
| 8,185,086 B2 | 5/2012 | Bozionek et al. | |
| 8,279,254 B2 | 10/2012 | Goose et al. | |
| 8,325,709 B2 | 12/2012 | Fartmann et al. | |
| 8,345,665 B2 | 1/2013 | Vieri et al. | |
| 8,571,541 B2 | 10/2013 | Seligmann et al. | |
| 8,621,645 B1 | 12/2013 | Spackman | |
| 8,645,207 B2 | 2/2014 | Blank | |
| 8,781,838 B2 * | 7/2014 | Krause | H04L 51/14 704/270 |
| 8,838,152 B2 | 9/2014 | Tang et al. | |
| 9,049,983 B1 * | 6/2015 | Baldwin | A61B 1/00039 |
| 9,336,435 B1 * | 5/2016 | Ozog | G06F 16/50 |
| 2002/0039426 A1 * | 4/2002 | Takemoto | G06F 3/165 381/104 |
| 2004/0198398 A1 | 10/2004 | Amir et al. | |
| 2004/0209654 A1 | 10/2004 | Cheung et al. | |
| 2006/0242235 A1 | 10/2006 | Classen et al. | |
| 2007/0135176 A1 | 6/2007 | Ho et al. | |
| 2008/0021962 A1 | 1/2008 | Ryan et al. | |
| 2008/0139178 A1 * | 6/2008 | Kawasaki | H04L 51/12 455/413 |
| 2010/0205667 A1 | 8/2010 | Anderson et al. | |
| 2010/0304766 A1 * | 12/2010 | Goyal | H04L 51/34 455/466 |
| 2011/0113025 A1 | 5/2011 | Kaal | |
| 2012/0035923 A1 | 2/2012 | Krause | |
| 2012/0284024 A1 * | 11/2012 | Mahalingam | H04M 1/72591 704/235 |
| 2014/0140530 A1 | 5/2014 | Gomes-Casseres et al. | |
| 2014/0294210 A1 * | 10/2014 | Healey | H04S 7/303 381/302 |
| 2015/0036835 A1 | 2/2015 | Chen | |
| 2015/0172434 A1 * | 6/2015 | Kawagishi | B60N 2/002 455/419 |

FOREIGN PATENT DOCUMENTS

| | | |
|---|---|---|
| EP | 1715648 A2 | 10/2006 |
| EP | 1850568 A1 | 10/2007 |
| EP | 2842787 A1 | 3/2015 |
| WO | 2013162556 A1 | 10/2013 |
| WO | 2013172848 A1 | 11/2013 |

* cited by examiner

US 11,483,425 B2

METHOD, DEVICE, AND SYSTEM FOR PROVIDING PRIVACY FOR COMMUNICATIONS

CROSS-REFERENCE TO RELATED APPLICATIONS

This application is a continuation application of U.S. patent application Ser. No. 14/640,554, filed on Mar. 6, 2015.

FIELD OF INVENTION

The present invention relates to communication systems, communication terminals and methods of using the same.

BACKGROUND OF THE INVENTION

Communication systems can be configured to permit one device to communicate with at least one other device. For instance, some communication systems can be configured so that one user is able to send a message to another user or otherwise communicate with another user by use of communication terminals such as mobile phones, telephones, electronic tablets, computers, or other types of communication terminals. International Publication No. WO 2013/172848, European Patent Publication No. EP 1 715 648, U.S. Pat. Nos. 8,838,152, 8,781,838, 8,645,207, 8,345,665, 8,325,709, 8,279,254, 8,185,086, 8,184,796, 8,169,949, 7,885,901, 7,672,436, 7,418,084, 7,187,764, and 6,968,179 and U.S. Patent Application Publication Nos. 2004/0198398, 2006/0242235, 2011/0113029 and 2014/0140530 disclose examples of different types of communication systems.

Communications that may include video and/or audio components or that may include data that is emittable audibly as well as visually often include a communication of video data and/or audio data that is exchanged between communication partners. Often, a user that receives a communication on his or her communication terminal may hear or see portions of that communication while third parties (e.g. other people) are near enough to that user's terminal to also hear and/or see such content. But, the sender of that data may not want it to be seen by those other parties.

Further, inadvertent disclosures to third parties of data received on a communication terminal can be problematic to the receiver of such information. For instance, the recipient may not want to share private information that he or she received from another person, but may not realize private information that is to be kept confidential is part of a received video or audio message until after the information has been output by the recipient's communication terminal in a way that could permit others who are nearby to hear or see such information.

SUMMARY OF THE INVENTION

A method of outputting content of a message or communication session is provided. Some embodiments of the method can include the steps of setting a privacy indicator that is applicable to a first communication to be received by a communication terminal of an addressee of the first communication; receiving, by the communication terminal, the first communication; determining that the privacy indicator applies to the received first communication; and outputting content of the first communication in accordance with at least one privacy setting identified by the privacy indicator in response to determining that the privacy indicator applies to the received first communication.

In some embodiments, the first communication can be a text message, an instant message, an email message, a voice mail message, or a telephone call. For instance, the first communication can be a message containing text and a text to speech function of the communication terminal can be suppressed or disabled for the received first communication to deactivate the text to speech function of the communication terminal in response to the determination that the privacy indicator applies to the first communication.

In some embodiments, the communication terminal may be configured to determine that the privacy indicator applies to the received first communication. For instance, in some embodiments of the method, a communication device can be configured to make such a determination and subsequently send information to the communication terminal to inform the communication terminal of this determination so that the communication terminal effects output of content of a message in compliance with a set of privacy rules corresponding to the setting of the privacy indicator. As another example, other embodiments of the method can be configured so that the communication terminal may directly determine that the privacy indicator applies to the first communication based on an assessment of information included in or with that first communication (e.g. information from signaling associated with the first communication, information, such as for example at least one parameter, included in a header or other portion of a message of the first communication, information included in at least one data packet used to transport the first communication to the communication terminal, etc.).

In some embodiments, the first communication can be configured to include a privacy indicator setting or a parameter identifying a privacy indicator setting. For instance, a parameter for the privacy indicator can be included in a header of a data packet used to transport content of the first communication, can be included in signaling for the first communication, or can be included in a header or other portion of a message that is a part of the first communication. As another example, In some embodiments of the method, the addressee of the first communication can be a user associated with the communication terminal. The outputting of content of the first communication in accordance with at least one privacy setting identified by the privacy indicator in response to determining that the privacy indicator applies to the received first communication can include: (i) determining, by the communication terminal, whether there is at least one person who is not the user associated with the communication terminal within a pre-specified distance of the communication terminal prior to the outputting of the content of the first communication; (ii) permitting output of content of the first communication in response to determining that no other person who is not the user associated with the communication terminal is determined to be within the pre-specified distance of the communication terminal; and (iii) deactivating audible outputting of content of the first communication in response to determining that there is at least one person who is not the user associated with the communication terminal within the pre-specified distance of the communication terminal.

In other embodiments, the outputting content of the first communication in accordance with at least one privacy setting identified by the privacy indicator in response to determining that the privacy indicator applies to the received first communication can include: (i) determining, by the communication terminal, whether there is at least one person who is not the user associated with the communication terminal within a pre-specified distance of the communication terminal prior to the outputting of the content of the first communication; (ii) outputting content of the first communication in response to determining that no other person who is not the user associated with the communication terminal is determined to be within the pre-specified distance of the communication terminal; and (iii) one of: (a) delaying outputting of content of the first communication audibly until input for audible output of the content is received in response to a warning and outputting the warning via a display of the communication terminal in response to determining that there is at least one person who is not the user associated with the communication terminal within the pre-specified distance of the communication terminal, (b) permitting output of content of the first communication audibly via at least one ear bud or a headphone device when the communication terminal is connected to the headphone device or at least one ear bud in response to determining that there is at least one person who is not the user associated with the communication terminal within the pre-specified distance of the communication terminal, and (c) permitting output of content of the first communication audibly via a speaker of the communication terminal at or below a pre-selected audible level when the communication terminal is determined to be in a first position in which the speaker is adjacent an ear of the user associated with the communication terminal in response to determining that there is at least one person who is not the user associated with the communication terminal within the pre-specified distance of the communication terminal.

In yet other embodiments, the outputting of content of the first communication in accordance with at least one privacy setting identified by the privacy indicator in response to determining that the privacy indicator applies to the received first communication can include: (i) determining, by the communication terminal, whether there is at least one person who is not the user associated with the communication terminal within a pre-specified distance of the communication terminal prior to the outputting of the content of the first communication; and at least one of: (A) permitting output of content of the first communication audibly in response to determining that no other person who is not the user associated with the communication terminal is determined to be within the pre-specified distance of the communication terminal, (B) permitting output of content of the first communication audibly at or below a pre-specified audible level via a speaker of the communication terminal in response to determining that there is at least one person who is not the user associated with the communication terminal within the pre-specified distance of the communication terminal and determining that the communication terminal is in a first position in which the speaker of the communication terminal is adjacent an ear of the user associated with the communication terminal, (C) permitting output of content of the first communication audibly in response to determining that no person who is identified within a first list is determined to be within the pre-specified distance of the communication terminal, (D) permitting output of content of the first communication audibly in response to determining that only one or more persons who are identified within a second list are determined to be within the pre-specified distance of the communication terminal, (E) permitting output of content of the first communication audibly via at least one ear bud or a headphone device when the communication terminal is connected to the headphone device or at least one ear bud, and (F) deactivating audible outputting of content of the first communication in response to determining that there is at least one person who is not the user associated with the communication terminal within the pre-specified distance of the communication terminal and in response to determining that the above conditions (A) through (E) are not met.

In some embodiments, the outputting content of the first communication in accordance with at least one privacy setting identified by the privacy indicator in response to determining that the privacy indicator applies to the received first communication can also include determining that the communication terminal has moved from the first position to a second position where the second position positions a camera sensor of the communication terminal to record a face of the user associated with the communication terminal and positions the speaker farther away from the ear as compared to the first position and deactivating audible output of content of the first communication by the communication terminal in response to determining that the communication terminal moved from the first position to the second position. The speaker of the communication terminal can be configured to output audio on a speakerphone setting when the communication terminal is in the second position in some embodiments.

In some embodiments of the method, the outputting of content of the first communication in accordance with at least one privacy setting identified by the privacy indicator in response to determining that the privacy indicator applies to the received first communication can include: determining, by the communication terminal, whether there is a person who is identified within a list associated with the privacy indicator within a pre-specified distance of the communication terminal prior to the outputting of the content of the first communication; permitting output of content of the first communication audibly in response to determining that no person who is identified within the list is determined to be within the pre-specified distance of the communication terminal; and deactivating output of the content of the first communication audibly in response to determining that at least one person who is identified within the list is determined to be within the pre-specified distance of the communication terminal.

A communication terminal is also provided. Some embodiments of the communication terminal can include hardware. For example, embodiments of the communication terminal can include a processor communicatively connected to non-transitory memory. The memory can have an application stored thereon that defines a method that is performed by the communication terminal when the processor runs the application such that the communication terminal is configured to: determine that a privacy indicator applies to a received first communication, and output content of the first communication in accordance with at least one privacy setting identified by the privacy indicator in response to determining that the privacy indicator applies to the received first communication.

The first communication can be a text message, an instant message, an email message, a voice mail message, a telephone call, or other type of communication. For instance, the first communication can be a message containing text and a text to speech function of the communication terminal can be suppressed or disabled for the received first communication to deactivate the text to speech function in response to the communication terminal's determination that the privacy indicator applies to the first communication.

In some embodiments of the communication terminal, the output of the content of the first communication in accordance with at least one privacy setting identified by the privacy indicator in response to determining that the privacy indicator applies to the received first communication can be configured to comprise: determining whether there is at least one person who is not the user associated with the communication terminal within a pre-specified distance of the communication terminal prior to the output of the content of the first communication; permitting output of content of the first communication audibly in response to determining that no other person who is not the user associated with the communication terminal is determined to be within the pre-specified distance of the communication terminal; and deactivating audible output of content of the first communication in response to determining that there is at least one person who is not the user associated with the communication terminal within the pre-specified distance of the communication terminal. In other embodiments of the communication terminal, the output of content of the first communication in accordance with at least one privacy setting identified by the privacy indicator in response to determining that the privacy indicator applies to the received first communication can be configured to include: determining whether there is at least one person who is not the user associated with the communication terminal within a pre-specified distance of the communication terminal prior to the output of the content of the first communication; permitting output of content of the first communication in response to determining that no other person who is not the user associated with the communication terminal is determined to be within the pre-specified distance of the communication terminal; and at least one of: (i) delaying outputting of content of the first communication audibly until input for audible output of the content is received in response to a warning and outputting of the warning via a display of the communication terminal in response to determining that there is at least one person who is not the user associated with the communication terminal within the pre-specified distance of the communication terminal, (ii) permitting output of content of the first communication audibly via at least one ear bud or a headphone device when the communication terminal is connected to the headphone device or at least one ear bud in response to determining that there is at least one person who is not the user associated with the communication terminal within the pre-specified distance of the communication terminal, (iii) permitting output of content of the first communication audibly at or below a pre-selected audible level via a speaker of the communication terminal when the communication terminal is determined to be in a first position in which the speaker of the communication terminal is adjacent an ear of the user associated with the communication terminal in response to determining that there is at least one person who is not the user associated with the communication terminal within the pre-specified distance of the communication terminal, (iv) permitting output of content of the first communication audibly in response to determining that no person who is identified within a first list is determined to be within the pre-specified distance of the communication terminal, (v) permitting output of content of the first communication audibly in response to determining that only one or more persons who are identified within a second list are determined to be within the pre-specified distance of the communication terminal, and (vi) deactivating audible outputting of content of the first communication in response to determining that there is at least one person who is not the user associated with the communication terminal within the pre-specified distance of the communication terminal and determining that conditions (i) through (v) are not met.

In some embodiments of the communication terminal, the communication terminal can be configured such that the output of content of the first communication in accordance with at least one privacy setting identified by the privacy indicator in response to determining that the privacy indicator applies to the received first communication includes: determining whether there is at least one person who is not the user associated with the communication terminal within a pre-specified distance of the communication terminal prior to the output of the content of the first communication; outputting content of the first communication in response to determining that no other person who is not the user associated with the communication terminal is determined to be within the pre-specified distance of the communication terminal; and one of: permitting output of content of the first communication audibly at an audible level at or below a pre-selected level via a speaker of the communication terminal in response to determining that there is at least one person who is not the user associated with the communication terminal within the pre-specified distance of the communication terminal and determining that the communication terminal is in a first position in which the speaker of the communication terminal is adjacent an ear of the user associated with the communication terminal; permitting output of content of the first communication audibly via at least one ear bud or a headphone device in response to determining that there is at least one person who is not the user associated with the communication terminal within the pre-specified distance of the communication terminal and determining that the headphone device or at least one ear bud is connected to the communication terminal, and deactivating output of the content of the first communication audibly in response to determining that the communication terminal is not in the first position and is not connected to at least one ear bud and is not connected to a headphone device and that there is at least one person who is not the user associated with the communication terminal within the pre-specified distance of the communication terminal. The output of content of the first communication in accordance with at least one privacy setting identified by the privacy indicator in response to determining that the privacy indicator applies to the received first communication can also include determining that the communication terminal has moved from the first position to a second position, where the second position positions a camera sensor of the communication terminal to record a face of the user associated with the communication terminal and positions the speaker farther away from the ear as compared to the first position, and deactivating audible output of the content of the first communication in response to determining that the communication terminal moved from the first position to the second position. The terminal can be configured so that the speaker is to output audio on a speakerphone setting when the communication terminal is in the second position.

In yet other embodiments of the communication terminal, the communication terminal can be configured such that the output of content of the first communication in accordance with at least one privacy setting identified by the privacy indicator in response to determining that the privacy indicator applies to the received first communication includes determining whether there is a person who is identified within a list associated with the privacy indicator within a pre-specified distance of the communication terminal prior to the outputting of the content of the first communication; permitting output of content of the first communication audibly in response to determining that no person who is identified within the list is determined to be within the pre-specified distance of the communication terminal; and deactivating audible output of content of the first communication in response to determining that at least one person who is identified within the list is determined to be within the pre-specified distance of the communication terminal.

A communication system is also provided. The communication system can include a communication terminal communicatively connectable to a communication device that hosts a communication service that supports transmission of at least one type of communication. The communication terminal can include a processor communicatively connected to non-transitory memory. The memory can have an application stored thereon that defines a method that is performed by the communication terminal when the processor runs the application such that the communication terminal is configured to determine that a privacy indicator applies to a received first communication and output content of the first communication in accordance with at least one privacy setting identified by the privacy indicator in response to determining that the privacy indicator applies to the received first communication.

In some embodiments of the communication system, the first communication can be a text message, an instant message, an email message, a voice mail message, a telephone call, or other type of communication. For instance, the first communication can be a message containing text and a text to speech function of the communication terminal can be suppressed or disabled for the received first communication to deactivate the text to speech function in response to the determination that the privacy indicator applies to the first communication.

Other details, objects, and advantages of the invention will become apparent as the following description of certain present preferred embodiments thereof and certain present preferred methods of practicing the same proceeds.

BRIEF DESCRIPTION OF THE DRAWINGS

Exemplary devices, systems, and apparatuses for providing communications between multiple communication terminals are shown in the accompanying drawings and certain exemplary methods of practicing the same are also illustrated therein. It should be understood that like reference numbers used in the drawings may identify like components.

DETAILED DESCRIPTION OF EXEMPLARY EMBODIMENTS

Figure 1:
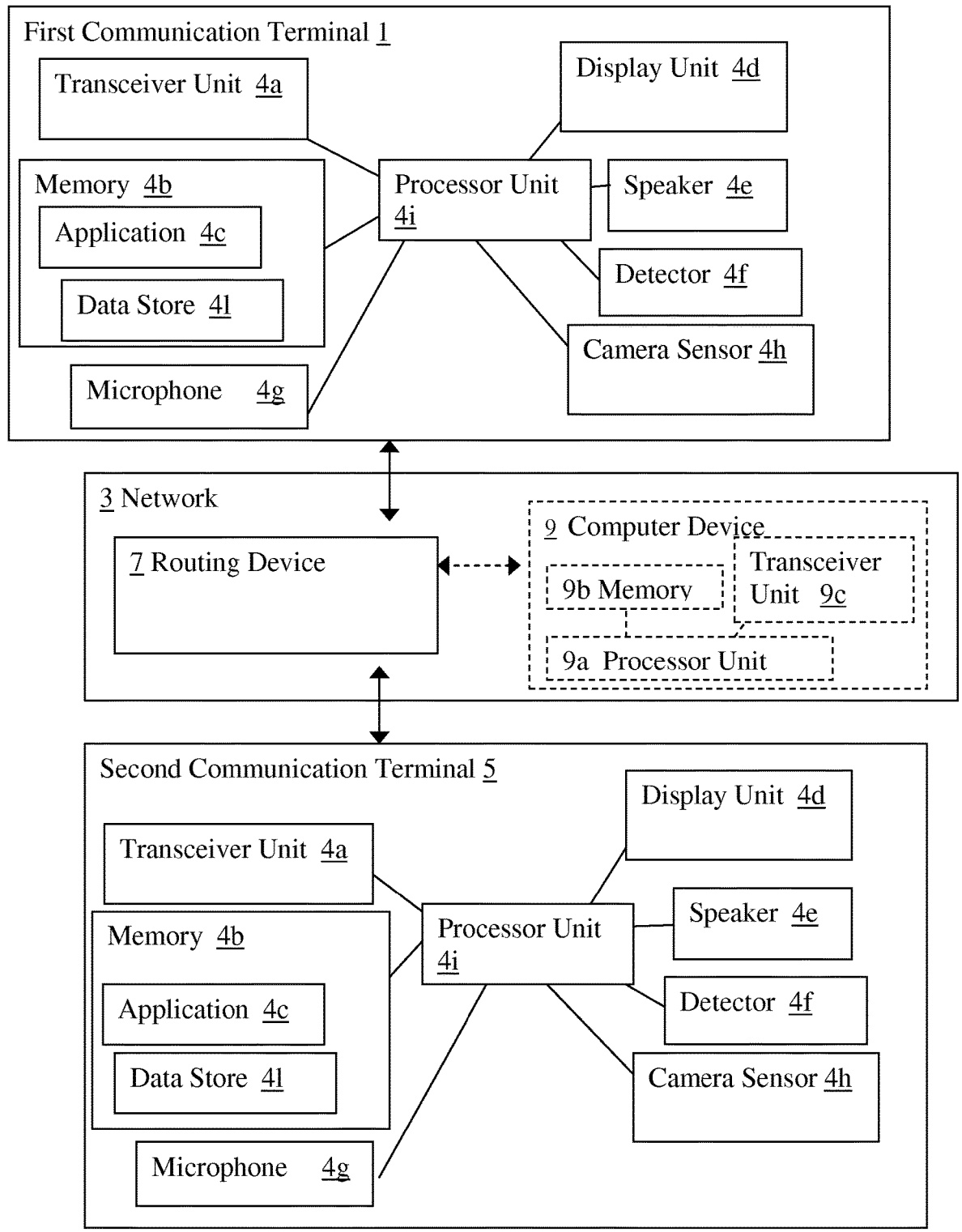
FIG. 1 is a block diagram of an exemplary embodiment of a communication system.

As may be appreciated from FIGS. 1-4, a communication system can include a plurality of communication terminals that are communicatively connectable via at least one network 3. A routing device 7, such as a communications server computer device, a switch device, a private branch exchange, or other type of routing device can be within the network 3 and can be communicatively connectable with the communication terminals to facilitate the establishment and/or maintenance of a communication connection and/or facilitate the sending and receiving of at least one communication message (e.g. an email, instant message, text message, social network message, chat session, etc.) between those communication terminals.

The network 3 can be the internet, a large area network such as an enterprise network, a cellular network, or other type of network. In some embodiments of the network 3, the network 3 can be comprised of multiple sub-networks that are interconnected together. The network 3 can include a number of network elements. For instance, the network 3 can include a plurality of network nodes that can include one or more gateways, one or more border control elements, one or more database devices, and multiple server computer devices that each hosts different communication services (e.g. an email server hosting device, an instant messaging hosting service device, at least one document storing server computer device, etc.) and a number of other types of network elements.

The communication terminals of the communication system can include a first communication terminal 1 and a second communication terminal 5. There may also be additional communication terminals within the communication system. Each communication terminal may be any type of communication endpoint such as a mobile telephone, a mobile electronic tablet, an internet appliance, a laptop computer, a notebook computer, a desktop computer, a personal digital assistant, a smart phone, a cellular phone, or other type of communication terminal device.

Each communication terminal (e.g. first communication terminal 1, second communication terminal 5, and/or other communication terminals of the network 3) can have hardware that includes a processor unit $4i$ that is communicatively connected to at least one transceiver unit $4a$, and at least one non-transitory memory $4b$. The processor unit $4i$ can be a microprocessor, central processing unit, a core processor, interconnected processors that are interconnected in series or in parallel, or other type of hardware processing element. The transceiver unit $4a$ can include at least one receiver and at least one transmitter. In some embodiments, the communication terminal can include multiple transceiver units to facilitate communication connections via a cellular network, a wireless large area network, and also include at least one transceiver unit for a short range communication (e.g. a Bluetooth transceiver device and/or at near field communication transceiver device). The memory $4b$ can be flash memory, a hard drive, or other type of non-transitory computer readable medium that is configured to store data. The data stored in the memory $4b$ can include at least one data store $4l$. Examples of such data can include documents, programs, databases, electronic data, and other types of data elements. The memory $4b$ can also store at least one application $4c$, which may be defined by code that is executed by the processor unit such that the communication terminal performs a method defined by the code of the application $4c$ such that the application configures the communication terminal to perform one or more functions.

Processor unit $4i$ can be connected to at least one input device 12 and/or at least one output device 11. For example, processor unit $4i$ can be communicatively connected to at least one microphone $4g$, at least one display unit $4d$, at least one speaker $4e$, and at least one camera sensor $4h$. The processor unit $4i$ can be communicatively connected to at least one detector $4f$. Detector $4f$ may be a sensor, an assembly of sensors, or other configuration of hardware that is utilizable to detect at least one condition. Display unit 4d can be a liquid crystal display, a monitor, or other type of display device. In some embodiments, the display unit 4d can be configured as an input/output device 13 by being configured as a touch screen display. Other types of input and/or output devices can also be communicatively connected to the processor unit 4i of the communication terminal. For instance, at least one button, a keyboard, a stylus, or a pointer device may be communicatively connected to the processor unit 4i of the communication terminal.

Figure 3:
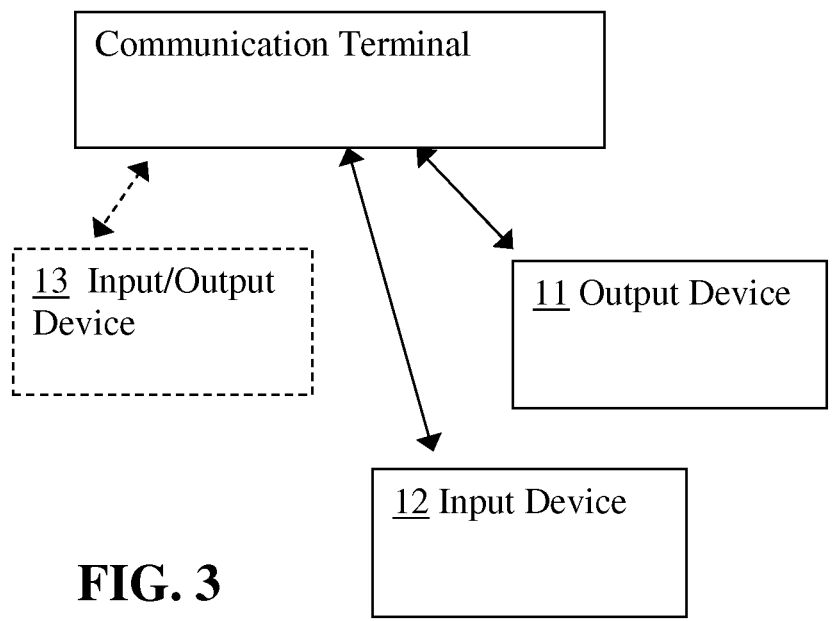
FIG. 3 is a block diagram of an exemplary embodiment of a communication terminal of the exemplary embodiment of the communication system illustrated in FIG. 1.
Figure 4:
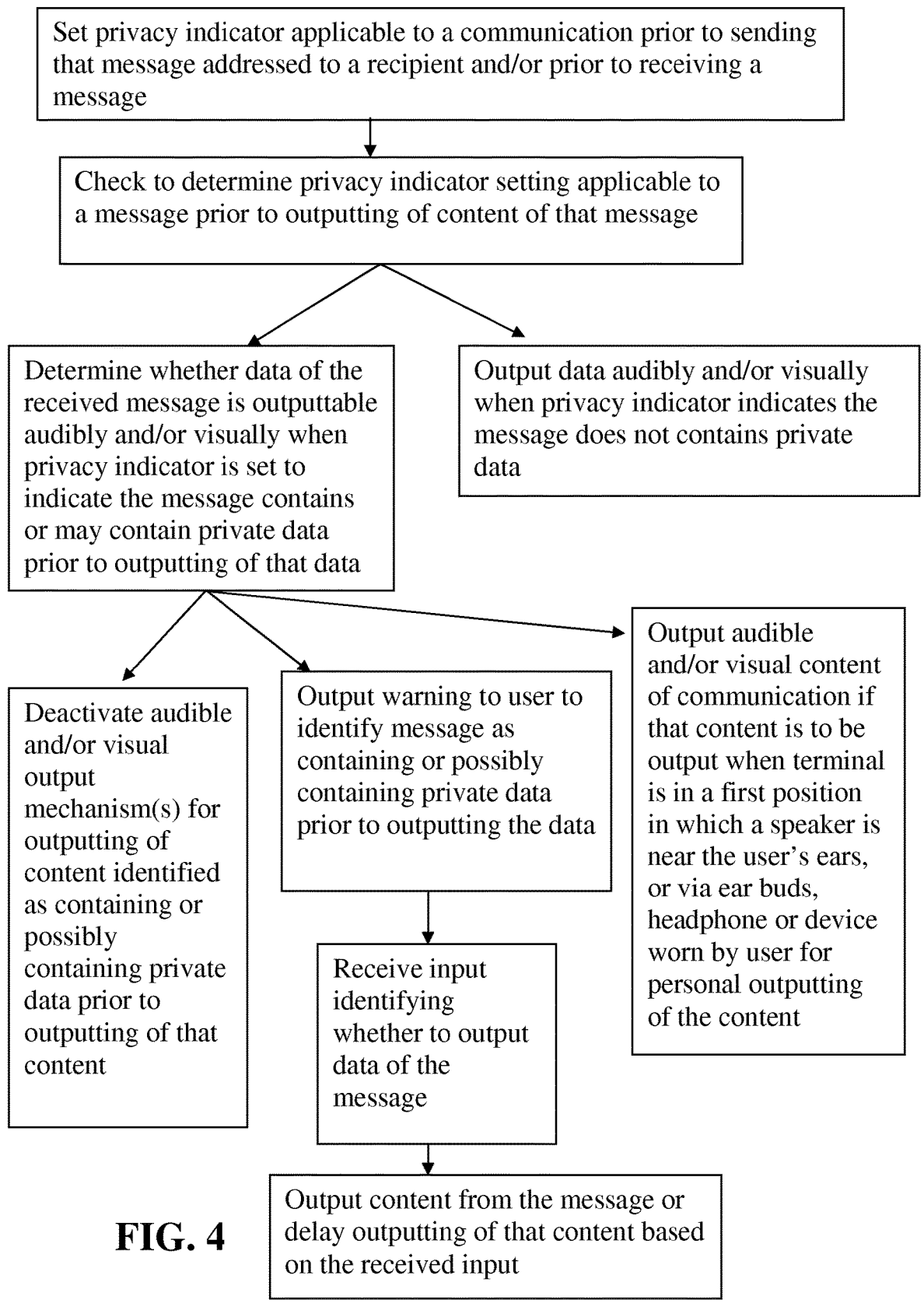
FIG. 4 is a flow chart illustrating an exemplary method that is utilizable in the exemplary embodiment of the communication system and an exemplary embodiment of the communication terminal.

Input and/or output devices and/or memory may be integral to one single housing of the terminal or may be external to a housing of the terminal that may house the processor unit 4i and be communicatively connected to the processor unit 4i via at least one wired and/or at least one wireless interface as may be appreciated from FIG. 3. For instance, at least one output device 11, at least one input device 12 and/or at least one input/output device 13 can be communicatively connectable to the processor unit 4i of the communication terminal. For example, in some embodiments, the speaker 4e and microphone 4g may be components of a headset or helmet that are communicatively connectable to the terminal. A display device can also be a component of such a headset or helmet as a visor or other type of display of that wearable device. As another example, the display unit 4d maybe a monitor or liquid crystal display that is integral to the housing of the terminal or may be a separate device that is connected via a wired or wireless interface (e.g. a universal serial bus ("USB") connection, a near field communication connection, etc.). As yet another example, the memory 4b can be an external memory device or a database server that is connected to the processor unit 4i and/or the camera sensor may be a separate video recording device that is communicatively connectable to the processor unit 4i via a wired or wireless connection (e.g. a USB connection, a near field communication connection, etc.).

Figure 2:
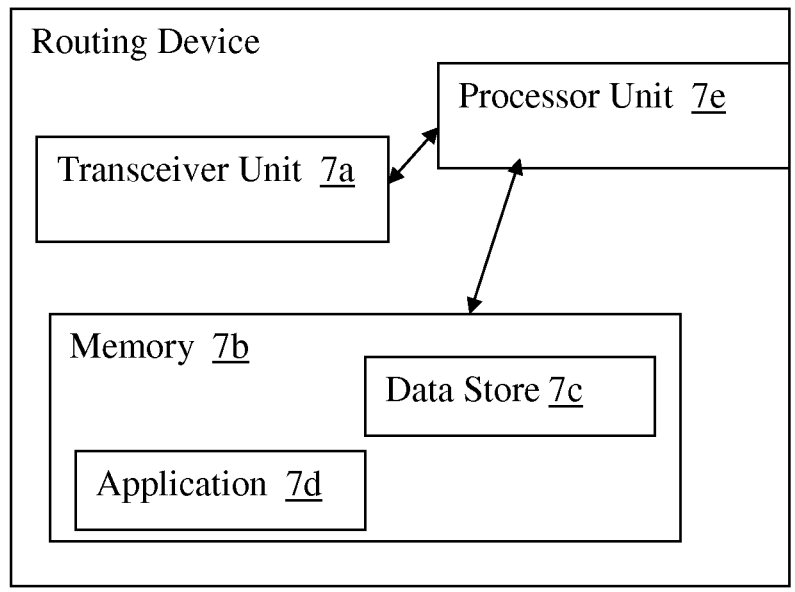
FIG. 2 is a block diagram of an exemplary embodiment of a routing device of the exemplary embodiment of the communication system illustrated in FIG. 1.

The routing device 7 can be configured as a type of communication device and can include hardware that includes a processor unit 7e that is communicatively connected to at least one transceiver unit 7a and at least one non-transitory memory 7b as may best be seen in FIG. 2. The processor unit 7e can be a microprocessor, interconnected processors (e.g. interconnected in series, interconnected in parallel, etc.), central processing unit, core processor, or other type of hardware processing element. The transceiver unit 7a can include at least one receiver and at least one transmitter. The memory 7b can be flash memory, at least one hard drive, or at least one other type of computer readable medium that is configured to store data. The data stored in the memory 7b can include at least one data store 7c. Examples of such data can include documents, programs, data bases, electronic data, and other types of data elements. The memory 7b can also store at least one application 7d, which may be defined by code that is executed by the processor unit 7e such that the routing device 7 performs a method defined by the code of the application 7d such that the application configures the routing device to perform one or more functions. The processor unit 7e of the routing device 7 can also be communicatively connected to other elements, such as at least one input device and at least one output device.

In some embodiments, the routing device 7 can be a switch device or a communication service hosting server computer device (e.g. a server computer device hosting a text messaging service, an instant messaging service, or a social networking service). In yet other embodiments, the routing device 7 can be configured as another type of communication service hosting device or may be configured as a router, an access point, a base station, or other type of communication device that can help facilitate the routing of communications between communication terminals that is communicatively connectable to a computer device 9 that is configured to host a communication service (e.g. computer device 9 may be a server computer device hosting a text messaging service, an instant messaging service, or a social networking service).

For example, the routing device 7 can be communicatively connected to at least one computer device 9 which is shown in broken line in FIG. 1. In some embodiments, the computer device 9 can be a server hosting a service offered via at least one website and/or a server computer device hosting services available via an application that is downloadable and installable on a terminal device, such as a social networking service. In other embodiments, the computer device 9 can be a data base storage device or a type of computer server device that hosts a service and is communicatively connectable to the routing device 7 to facilitate providing that service to either the routing device 7 or at least one of the communication terminals (e.g. first communication terminal 1, second communication terminal 5, and/or other communication terminals). The computer device 9 can be configured as a type of communication device or system of interconnected computer devices. In some embodiments, the computer device 9 can be comprised of hardware, which may include a processor unit 9a that is communicatively connected to at least one transceiver unit 9c and non-transitory memory 9b that has at least one application and at least one data store stored therein. An application stored in the memory can configure the computer to perform one or more functions that are performed when the processor executes that application. The processor unit 9a can be a microprocessor, interconnected processors, a central processing unit, core processor, or other type of hardware processing element. The memory 9b can be flash memory, at least one hard drive, or at least one other type of computer readable medium that is configured to store data (e.g. at least one data store, documents, programs, data bases, electronic data, at least one application, etc.). The transceiver unit 9c can include at least one receiver and at least one transmitter. One or more input devices and/or one or more output devices can also be communicatively connected to the processor unit 9a of the computer device 9.

Embodiments of the communication terminal, routing device 7, computer device 9 and/or communication system can be configured to facilitate the exchange of communications to help facilitate private output of content within a sent instant message, text message, email message, voice mail message, phone call, or other type of communication. For instance, embodiments of the communication system can be configured to facilitate the performance of the method illustrated in FIG. 4.

For example, in some embodiments a user of a first communication terminal 1 that desires to send a message receivable by a user of a second communication terminal 5 as an addressee of that message as a first communication may, before sending the message via the first communication terminal 1, set a privacy indicator to identify the message as containing private and/or confidential information that should not be output in a publicly accessible way.

The privacy indicator can be a setting that is applicable to just the one message to be sent so that the sending user must actuate the indicator setting to privacy for each message to be sent with such an indicator. A communication terminal of the sending user may include data in the message to be sent (e.g. a parameter, an indicator within a header of the message, etc.) to indicate the privacy setting indicates the message may have private data for appropriate outputting by a terminal device of the one or more recipients to that message in response to the sending user providing input that sets the privacy indicator to a privacy identifying setting. The privacy setting set by a sending user can help define what the privacy rules and/or settings identified by the indicator are (e.g. no text to speech functionality is permitted and/or applicable to the textual content of the sent message, no audible output of the content of the message is permitted, no audible output of message is permitted if one or more defined persons (e.g. any person or a person on a blacklist of multiple different users) are located nearby the recipient, etc.).

Alternatively, the privacy indicator may be set so that it is applicable to all messages that may be sent after the privacy indicator setting is set to a privacy setting until the privacy indicator setting is re-adjusted to a non-private setting or may be set such that all messages sent to a particular addressee or a pre-selected group of addressees are to have a privacy setting until the privacy setting is readjusted to a non-private setting. Such a setting may be set at a communication terminal by a sending user providing input to the communication terminal to apply the privacy setting to such messages so that the privacy setting is effected by the communication terminal in response to such input. For instance, the communication terminal can be configured so that each message to be sent by the sending user to any addressee or to a particular one or more addressees includes data (e.g. a privacy indicator) that indicates the privacy setting is to be on so that any recipient communication terminal that is to output the content of the message does so in compliance with pre-defined or pre-selected privacy rules.

As another example, a privacy indicator setting may be communicated by the communication terminal of the sending user to the routing device 7 and/or computer device 9 for having the privacy indicator setting applied to the one or more messages to be sent by that user via that user's communication terminal. The routing device 7 or computer device 9 may then set the privacy setting for an account associated with the user of the communication terminal to help ensure that messages sent by that user via the user's communication terminal are transmitted to one or more recipients with a setting actuated and/or data included with that message to inform the terminals of the recipients that receive the message that the content of the message may have or does have private and/or confidential data that is to be output in accordance with predefined privacy rules or privacy output settings.

For example, the routing device 7 or computer device 9 may include data with or in the message after receiving the message from the first communication terminal and prior to sending that message to the communication terminal of an addressee for delivery of that message to indicate to a terminal that receives the message how that data should be output by the terminal in compliance with the pre-selected or predefined privacy settings and/or rules. The routing device 7 or computer device 9 may alternatively be configured to respond to the setting of the privacy indicator to effect delivery of any message sent by the user so that the output of the message complies with pre-selected privacy output settings or rules. For instance, the routing device 7 or computer device 9 may convert certain audio data into text data prior to delivery of the message having the altered content to a recipient communication terminal in addition to including a privacy indicator with or in the message that indicates any text to speech functionality is to be disabled, suppressed, or otherwise deactivated for outputting the content of that message when privacy of the message might be compromised by audio playback of the message if one or more third parties is determined to be near the communication terminal that receives the message for outputting of the content of the message.

The privacy indicator setting may also be set by a communication terminal of a user that is to be a recipient of one or more messages. The recipient user may provide input via his or her communication terminal to set an indicator in his or her communication terminal via entering input to adjust the setting of a privacy indicator from non-private to private so that any message received by the communication terminal is output in accordance with pre-defined or pre-selected privacy output rules and/or settings. The communication terminal may then be configured to output a received message in accordance with the applicable rules and/or settings. The communication terminal may also communicate with the routing device 7 and/or computer device 9 so that the privacy setting associated with the recipient user of that communication terminal is set at the computer device 9 and/or routing device 7 so that messages received by that device that are addressed to that recipient user are adjusted in content or by inclusion of data to effect compliance with pre-selected or predefined privacy settings and/or rules prior to delivery of the message to a communication terminal of the recipient user. For example, the routing device 7 or computer device 9 may convert certain audio data into text data in some embodiments. As another example, the routing device 7 or computer device may include data in the message prior to delivery to indicate to a terminal that receives the message how that data should be output by the terminal in compliance with the pre-selected or predefined privacy settings and/or rules in other embodiments.

In some embodiments, a privacy indicator for a message may be set by a user who intends to send a message by providing input via the first communication terminal 1, which may be the terminal of that user. The privacy indicator may then be set by an indicator parameter stored in a data element of the communication terminal or by the indicator setting being communicated to a routing device 7 or computer device 9 to have that setting stored in memory of that device so that an account associated with the user has the privacy setting linked to that user's account. The transmission of such a message to the routing device 7 or computer device 9 can also include authentication data for the user (e.g. a password, log-in code, address information and/or other type of authentication information) that may be utilized for associating the user with the privacy setting identified in the message.

After the privacy setting is set, a message may be sent by the user that is addressed to one or more addressees. That message may include privacy indication data identifying content of that message is to be output in compliance with pre-selected privacy settings or rules to try to avoid having third parties learn of the content of the message. In some embodiments, the privacy indication data can be a parameter included in the header of the one or more data packets that may transmit the content of the message, a parameter that is otherwise embedded in the message, or a parameter that is transmitted in association with the multimedia data (e.g. video, audio, and/or text) of the message that is to be deliver to an addressee of the message for output of the multimedia content of the message to the addressee. In some embodiments, the first communication terminal 1 may insert such data into the message prior to sending the message. In other embodiments, the routing device 7 or computer device 9 may receive the message to be sent prior to delivery of the message to an addressee and subsequently add such data into the message before forwarding the message on for delivery. After the message is received by the routing device 7 and/or computer device 9 hosting the service, the message may be delivered to the communication terminal of the addressee (e.g. a recipient communication terminal). For this example, the second communication terminal 5 may be the terminal of the addressee that receives the message.

In response to receiving the message, the second communication terminal 5 may check the message to determine whether data included in the message or otherwise included with the message identifies the message as containing private and/or confidential data. If an identifier indicating the privacy setting is actuated is included with the message, the second communication terminal 5 may be configured to help ensure the content of the received message is output in compliance with pre-selected privacy settings or rules.

For example, when the second communication terminal 5 determines that the privacy indicator is set for the content of a received message, it may be configured to output a warning to a user to identify the message as containing private data prior to outputting the content of the message. The warning may include a visual display. An audio component to the warning may be emitted in connection with the display of the visual component of the warning. The warning may also request the user to provide input that instructs the terminal to output the content audibly prior to the content of the message being audibly output via a speaker of the communication terminal. The second communication terminal 5 may then only output that data after a user provides input in response to the warning to indicate how the content of the received message is to be output. For example, if the received message is a text message or other message containing audio data to be output via a speaker or if the message contains text that the communication terminal is configured to convert into audio data for audible output via one or more speakers, the audible outputting of the content of the message may be disabled, suppressed, prevented or otherwise deactivated by the communication terminal unless and/or until the communication terminal receives input in response to the emitted warning that overrides the audible output deactivation.

As another example, when the second communication terminal 5 determines that the privacy indicator is set for the content of a received message, it may be configured to use at least one detector to determine whether any third parties and/or third party devices are nearby. If one or more such third parties and/or third party devices are detected, the second communication terminal 5 may either delay output of the content of the received message via issuance of a warning as discussed herein, may be configured to deactivate any type of audible outputting of content of the message when one or more third parties and/or third party devices are determined to be nearby and/or may be configured to only permit audible output the content of the received message that is in compliance with one or more other types of pre-set privacy rules or settings.

The detection of nearby third parties and/or third party devices can be made by the second communication terminal 5 via at least one detector 4f. For instance, the detector 4f can be configured to determine whether any nearby terminal devices are present within a pre-selected distance of the communication terminal via a near field communication transceiver or other type of short range radio communication interface to determine whether any non-user third party person and/or third party device is near the communication terminal. If one or more other devices are available for connection via a near field communication connection, a Bluetooth connection, or other type of short range communication interface, the detector 4f can be configured to determine that third parties are near the second communication terminal 4. As another example, the second communication terminal 5 can be configured to detect nearby users via an audio detector or motion detector that may be configured to determine whether any third person is within a pre-selected distance of the second communication terminal 5 (e.g. a 3 meter distance from the second communication terminal 5, a 1 meter distance from the second communication terminal 5, etc.). As yet another example, the detector 4f can be configured to determine that one or more third parties are within a pre-selected distance of the communication terminal based on presence statuses of other users and/or a proximity detector configured to detect a third party or a device a third party is expected to be carrying (e.g. a third party device such as a smart phone of the third party or an electronic tablet of a third party). As yet another example, the second communication terminal 5 can be configured to determine whether any third parties are within a pre-selected distance of the communication terminal based on whether any third party is connected to a local area network to which that terminal is connected (e.g. a wireless local area network connection, such as, for example, a wireless connection in compliance with Institute of Electrical and Electronics Engineers' (IEEE) 802.11 standards). As yet another example, the second communication terminal 5 may be configured to determine whether any third parties are within a pre-selected distance of the communication terminal based on a connection that terminal device may have with one or more services hosted by other server computer devices, such as a wirelessly sharing content service (e.g. the AirDrop service offered by Apple Inc. or the Dropbox service offered by Dropbox Inc.) The detection methodology utilized by the second communication terminal can also include a combination of such approaches (e.g. use of one or more detection mechanisms in combination with communications exchanged with other devices to determine whether any third parties are present).

If one or more nearby third parties is detected as being within the pre-selected distance of the communication terminal, the second communication terminal 5 may emit a warning and only output the data after that warning is acknowledged via input provided by the user as discussed herein, may automatically delay and/or deactivate audible output of the content of the received message or may be configured to only output content of the received message in compliance with pre-set privacy rules or settings that may be configured for permitting output of audio and/or video content when that content may only be output for hearing and seeing by the recipient. For example, a user of the second terminal 5 may be unable to have a received textual content of a message output via a speaker by use of a text to speech function if a nearby other person is determined to be present. As another example, a voice mail message, a text message having audio content, or an email containing audio content (e.g. an audio file) may not have its content output via a speaker of the communication terminal unless the user is wearing ear buds, headphones, a headset having an ear bud or headphone element, or other type of headphone device that is configured for outputting of audio to only the user wearing that device for output of that audio content or has the communication terminal in a first position in which the speaker 4e is near the user's ear for emission of audio into the ear at or below a pre-determined decibel level to help ensure private delivery of the audio content. As yet another example, the second communication terminal 5 may not display the content of a received message if a nearby third user is detected unless the content is to be output on a visor of a helmet, glasses, or a display of other headwear the user may be wearing or have connected to the communication terminal for output of that content to only the user.

In some embodiments, the privacy setting or privacy rules can be set to define how a communication terminal is to output content of a received message. For example, the privacy settings and/or rules applicable to a message with respect to which a privacy indicator has been set can be configured so that content of that message is only output in compliance with privacy settings or rules when one or more pre-defined other third parties are determined to be near the communication terminal of a recipient to a message.

For example, the privacy settings or rules can be set so that no audible output of the content of the received message or no publicly audible output of the content of the received message may occur if there is any third party detected near the second communication terminal 5 as discussed herein. As another example, the privacy settings or rules can be set so that whether audible output of the content of a message can be permitted by the second communication terminal is linked to a particular user or set of users known to the sender of a message. Such linking of a privacy setting to a group of users may include data indicating that a privacy indicator setting is applicable to a group of users. Such a group of users may include, for example, the supervisor of that user or other type of overseer or manager of that user. Such users may be defined in a blacklist so that any detection of such users in the backlist being within the pre-selected distance of the second communication terminal 5 results in a third party being determined to be near the second communication terminal 5 so that precautions are taken to avoid public disclosure of the content of the received message by use of any or all of the prevention of public audio output mechanisms discussed herein (e.g. use of a warning, only outputting audio if ear bud or headphone device is to have that audio output therefrom. In this blacklist example, if only other third parties are identified, but the parties are not in the defined blacklist, then the second communication terminal may determine that content of the received message may be output without taking any precautions (e.g. emitting a warning or preventing audible outputting of content in a way that is hearable by nearby other people as discussed herein, etc.).

As yet another example, the privacy settings or rules can also be configured to define a whitelist so that public output of content of a received message having a privacy indicator setting of privacy applicable to that message is permitted when the people detected to be within the pre-selected distance of the second communication terminal 5 (e.g. are near that second communication terminal) are only users identified within the whitelist (e.g. all the detected nearby users are identified in the whitelist). If one or more nearby people that are detected are not within the whitelist, the second communication terminal 5 can be configured to take precautions prior to output of the content of the message as defined by the pre-selected privacy settings and/or rules as discussed herein.

In other embodiments, a privacy indicator applicable to one or more messages or other type of communication that may be addressed to a user as the recipient of those messages may be set by the recipient prior to receipt of those communications so that the setting is applicable to those messages or other types of communications. For such embodiments, the communication terminal of that user (e.g. the first communication terminal 1 or second communication terminal 5) may determine that any message received by that terminal via one or more pre-defined types (e.g. text messages, instant messages, a particular social media networking message type such as direct messages sent via a communication service offered by Twitter Inc., and/or email messages) is to be treated as having private content and to only be output in compliance with predefined privacy settings and/or rules. After such a setting is selected by input made by the user of the second communication terminal, any message so received may have its content output via the communication terminal in accordance with those privacy settings and/or rules. The communication terminal may also undertake determining the presence of nearby third parties as discussed herein (e.g. personnel who are not the user of the communication terminal that are within a pre-selected distance of the communication terminal) prior to outputting the content of such received messages in accordance with the privacy settings and/or rules.

The communication terminal (e.g. the first and/or second communication terminals 1 and 5) may also be configured to facilitate compliance with privacy settings that can be associated with telephone calls or video telephone calls between different terminals. Such an association of a privacy indicator for such a communication session may be set via input entered by a user when entering a phone number or otherwise addressing a phone call to at least one addressee to be initiated. Such a setting of the privacy indicator can also be set during the call by the user providing input to the communication terminal for sending to the other user's communication terminal during the communication session to identify new content of the call to include private and/or confidential information so that privacy settings and/or rules are applicable after the communication session is established during that communication session. When a communication terminal receives the data indicating or otherwise identifying that the privacy indicator is set so that privacy settings or rules are applicable to the communication session, it may take actions to effect compliance with those privacy rules and/or settings.

For example, the detector 4f of the communication terminal may have one or more detectors, such as at least one proximity sensor or at least one light sensitivity sensor, that are configured to determine when the communication terminal is near a user's ear for engaging in a traditional audio only communication session. Detector 4f may detect the movement from the first position to the second position. For example, detector 4f may detect a change in position based on a substantial change in light received by camera sensor 4h for a predetermined period of time or by the camera sensor being positioned a predetermined distance from a solid object, such as a body part of the user, for a predetermined period of time.

For example, during a telephone call or video call communication session established between the first and second communication terminals 1 and 5, the user of the first communication terminal 1 may adjust his or her terminal from between a first position which places the communication terminal 1 near his or her ear so that the speaker 4e of the communication terminal 1 is located near his or her ear and a microphone 4g of the terminal is located near the user's mouth to a second position that can be used for having the camera sensor 4h record his or her face while participating in the communication session. The speaker 4e may be located much farther from the user's ear when the terminal is in the second position as compared to the first position.

The first position may place the camera sensor 4h in a location that would record the user's cheek or ear or may record the environment around the user that is off to the side of the user's face and in a line of sight of the user's ear, which would provide video that would have little or no value to the other communication partners involved in the communication session. If the communication terminal is detected as being moved from the first position in which audio is to be output from the speaker 4e to a very nearby ear (e.g. an ear within 1-10 centimeters of the speaker of the terminal or an ear within 0-5 centimeters of the speaker of the terminal) of the user to the second position where the speaker is to have its audio output increased for speaker phone operation and/or the camera sensor 4h is positioned for recoding the user's face, the processor unit of the communication terminal may cause the communication terminal to take steps to ensure compliance with any applicable privacy setting or rule that may be applicable to the phone call or video call. For instance, upon a detection of a change in positioning of the communication terminal 1 by the detector 4f, the processor unit 4i may be configured to transmit a warning to the user via the display unit 4d to inform the user that the communication terminal 1 is no longer in a position to present received audio in a private way that would be in compliance with applicable privacy rules or settings associated with the communication session. The warning may thereby inform the user that the audio may not be output via speaker phone operation or at a pre-selected speaker phone audible level to prompt the user to return the communication terminal to the first position for the remainder of the communication session to have the audio output via a speaker at or below the pre-selected threshold level. In combination with the transmission of such a warning (or as an alternative to the transmission of such a warning), the communication terminal may also prevent the output of audio from the speaker 4e and/or any video from the display unit 4d until the communication terminal is determined to be moved back into the first position. As another option, output of the audio content of the communication session may be prevented during the communication session when the terminal is determined to be in the second position until the communication terminal has determined that one or more pre-specified criteria are met such as, for example, that no third parties are near the communication terminal, that no third party within a defined blacklist is within a pre-specified distance of the communication terminal, or that the only detected nearby third parties are parties identified within a whitelist. This determination regarding the existence of nearby users may be made prior to the terminal moving from the first position to the second position or after that change in position occurs.

The privacy settings and/or rules to be identified by the privacy indicator setting can be defined in accordance with a particular pre-selected protocol. For instance, the privacy setting can be defined by a parameter selected by input provided by a user (e.g. a use that is an addressee to one or more messages, a user who is a sender of one or more messages, a user who is a communication session participant, etc.). The selected parameter can identify a particular pre-defined level of privacy protection from a number of selectable options. The privacy setting can also include data identifying other users that are to be included in a blacklist or whitelist. The selected parameter can also identify such a list or the privacy indicator can be supplemented with further privacy related data that can include data that identifies the whitelist or blacklist to other terminals.

It should be appreciated that many different types of variations to the above discussed embodiments of the communication terminal, communication system, and method of making and using the same may be made. For instance, each of the communication terminals may be any of a laptop computer, a tablet, or other type of mobile communication device that is able to communicate with other devices via at least one network connection, such as an internet connection, enterprise network connection, or cellular network connection (e.g. the first communication terminal 1 may be a tablet and the second communication terminal 5 may be a smart phone or a laptop computer). As another example the routing device 7 and/or a computer device 9 may be configured as a type of communication device or as a workstation.

As yet another example, the pre-selected distance that a third party (e.g. another person who is not a user of the terminal) is to a communication terminal to be considered nearby that user and a threat to the privacy of a communication such that preventing audible output of content of a communication in a possibly public disclosing way occurs may be any of a number of different distances. For example, the distance can be defined by whether a third party is within 2 meters, 3 meters, or 10 meters of the communication terminal or whether that third party is associated with a device that is connected to the same access point or local area network as the communication terminal receiving a communication or whether that third party is associated with a device that is connectable to the user's communication terminal via a short range communication mechanism (e.g. Bluetooth, near field communication, etc.). As another example, deactivation of audible output of content of a communication can be configured in a number of different ways. A suppression, disabling, or other type of deactivation of a text to speech functionality for the output of text content of a message, the deactivation (e.g. disabling) of the speaker of a communication terminal for outputting of the content of that message in an audible format, a delay of outputting any audio that is to audibly output text content of a message until a warning is acknowledge and input is provided to override that warning and cause the audio to be output, or other type of deactivation of audible output of content of a communication can be configured as such a deactivation.

As yet another example, an addressee of a communication can be an addressee by being a listed addressee or carbon copy or blind carbon copy recipient to an email message, being called via a telephone call using a phone number associated with that person or a phone number associated with a telephone associated with that person, or by being a listed recipient for a social networking message, text message, or instant message by use of an address or other delivery identifier associated with the recipient for delivery of that communication to the recipient via a communication terminal associated with that recipient (e.g. recipient's electronic tablet, telephone, smart phone, and/or personal computer). As yet another example, a communication terminal can be configured to utilize multiple different mechanisms for taking precautions to prevent public audible output of content of a communication when a nearby third party is detected as being within a pre-selected distance of the communication terminal at which the content is to be output to the user using that terminal. For instance, any combination of the multiple different mechanisms for preventing public audible output and/or visual output of such content can be utilized. Further, multiple different detection mechanisms such as those discussed herein can also be used in combination to determine the presence of nearby third parties.

While certain exemplary embodiments of the communication terminal, communication system, and methods of making and using the same have been shown and described above, it is to be distinctly understood that the invention is not limited thereto but may be otherwise variously embodied and practiced within the scope of the following claims.

What is claimed is:

1. A method of outputting content of a message or communication session, comprising:
setting, based on input related to a first communication, a privacy indicator that is applicable to the first communication to be received by a communication terminal associated with a user, wherein the privacy indicator indicates that content of the first communication includes private information to be output to the communication terminal in accordance with a privacy setting stored in response to an input from the user;
receiving, by the communication terminal, the first communication;
determining, by the communication terminal and based on the privacy indicator, that the privacy setting applies to the received first communication;
determining that neither a headphone device nor an ear bud is connected to the communication terminal; and
in response to determining that neither the headphone device nor the ear bud is connected to the communication terminal, outputting content of the first communication audibly in accordance with the privacy setting.

2. The method of claim 1, further comprising:
in response to determining that neither the headphone device and the ear bud are not connected to the communication terminal and that a person who is not the user associated with the communication terminal is within a pre-specified distance:
identifying the person who is not the user associated with the communication terminal that is within the pre-specified distance.

3. The method of claim 2, further comprising:
in response to determining that the communication terminal is not in a first position in which the speaker of the communication terminal is adjacent an ear of the user associated with the communication terminal, and that the person who is not the user associated with the communication terminal is not identified within a list, deactivating audible outputting of content of the first communication.

4. The method of claim 3, wherein the list includes a first list and a second list, the method also comprising:
permitting output of content of the first communication audibly in response to determining that no person who is identified within the first list is determined to be within the pre-specified distance; and
permitting output of content of the first communication audibly in response to determining that only one or more persons who are not the user associated with the communication terminal and identified within the second list.

5. The method of claim 4, comprising:
permitting output of content of the first communication audibly at or below a pre-specified audible level via a speaker of the communication terminal in response to determining that at least one person who is not the user associated with the communication terminal is within the pre-specified distance and is not identified within the second list, and determining that the communication terminal is in the first position.

6. The method of claim 1, wherein the first communication is a text message, an instant message, an email message, a voice mail message, or a telephone call.

7. The method of claim 1, wherein setting the privacy indicator comprises:
a sending communication terminal of the sender sending data for the first communication to a computer device that hosts a service for the first communication;
the computer device inserting the privacy indicator into the header of the message prior to sending the first communication to the communication terminal based on a privacy indicator setting previously communicated to the computer device via input from the sender.

8. The method of claim 1, wherein the outputting content of the first communication comprises:
determining that the communication terminal has moved from the first position to a second position, wherein the second position includes a camera sensor of the communication terminal positioned to record a face of the user associated with the communication terminal and the speaker of the communication terminal positioned farther away from the ear as compared to the first position; and
deactivating audible output of content of the first communication by the communication terminal in response to determining that the communication terminal moved from the first position to the second position.

9. The method of claim 8, wherein the speaker of the communication terminal is configured to output audio on a speakerphone setting when the communication terminal is in the second position prior to the deactivating of the audible output of content of the first communication terminal by the communication terminal.

10. A communication terminal associated with a user, comprising:
a processor communicatively connected to a non-transitory computer readable medium, the non-transitory computer readable medium having an application stored thereon, the application defining a method that is performed by the communication terminal when the processor runs the application such that the communication terminal is configured to:
determine, based on a privacy indicator included in a header of a message of the first communication received by the communication terminal, that a privacy setting stored in response to an input from the user applies to a received first communication, wherein the privacy indicator indicates that content of the first communication includes private information to be output in accordance with the privacy setting, and
output content of the first communication audibly in accordance with the privacy setting in response to determining that the privacy setting applies to the received first communication and determining that neither a headphone device nor an ear bud is connected to the communication terminal.

11. The communication terminal of claim 10, wherein the communication terminal is further configured to:
permit output of content of the first communication audibly in response to determining that only one or more persons who are not the user associated with the communication terminal and are identified within a first list are determined to be within a pre-specified distance.

12. The communication terminal of claim 10, wherein the communication terminal is further configured to:

permit output of content of the first communication audibly at or below a pre-specified audible level via a speaker of the communication terminal in response to determining that at least one person who is not the user associated with the communication terminal within a pre-specified distance and is not within a first list, and determining that the communication terminal is in a first position in which the speaker of the communication terminal is adjacent an ear of the user associated with the communication terminal.

13. The communication terminal of claim 10, wherein the communication terminal is further configured to:
   permit output of content of the first communication audibly in response to determining that no person who is not the user associated with the communication terminal is within a pre-specified distance.

14. The communication terminal of claim 10, wherein the communication terminal is further configured to:
   in response to determining that the headphone device and the ear bud are not connected to the communication terminal, a person who is not the user associated with the communication terminal is within a pre-specified distance and is not identified within a first list, and the communication terminal is not in a first position, deactivating audible outputting of content of the first communication.

15. The communication terminal of claim 10, wherein the communication terminal is further configured to:
   (i) permit output of content of the first communication audibly in response to determining that only one or more persons who are identified within a first list and who are not the user are determined to be within a pre-specified distance of the communication terminal based on an identification of the at least one person who is not the user that is within the pre-specified distance,
   (ii) permit output of content of the first communication audibly at or below a pre-specified audible level via a speaker of the communication terminal in response to determining that at least one person who is not the user associated with the communication terminal is within the pre-specified distance and is not within the second list, and determining that the communication terminal is in a first position in which the speaker of the communication terminal is adjacent an ear of the user associated with the communication terminal, and
   (iii) in response to determining that at least one person who is not the user associated with the communication terminal is within the pre-specified distance and is not identified within the second list, the headphone device and the ear bud are not connected to the communication terminal, and the communication terminal is not in the first position, deactivating audible outputting of content of the first communication.

16. A non-transitory computer readable medium having an application stored thereon, the application defining a method that is performed by a communication device when a processor of the communication device runs the application, the method comprising:
   setting, based on input received from a sender of a first communication, a privacy indicator that is applicable to the first communication to be received by the communication device of an addressee of the first communication, wherein the privacy indicator is included in a header of a message of the first communication and indicates that content of the first communication includes private information to be output to the communication device in accordance with a privacy setting stored in response to an input from the addressee;
   in response to receiving the first communication, the communication device determining, based on the privacy indicator, that the privacy setting applies to the received first communication;
   determining that neither a headphone device nor an ear bud is connected to the communication terminal; and
   in response to determining that neither the headphone device nor the ear bud is connected to the communication terminal, outputting content of the first communication audibly in accordance with the privacy setting.

17. The non-transitory computer readable medium of claim 16, wherein the method further comprising:
   in response to determining that the headphone device and the ear bud are not connected to the communication device and that a person who is not the user associated with the communication device is within a pre-specified distance:
   identifying the person who is not the user associated with the communication terminal that is within the pre-specified distance.

18. The non-transitory computer readable medium of claim 17, the method further comprising:
   in response to determining that at least one person who is not the user associated with the communication device is within a pre-specified distance of the communication device, the headphone device and the ear bud are not connected to the communication device, the communication device is not in a first position in which the speaker of the communication device is adjacent an ear of the user associated with the communication device, and that person who is not the user associated with the communication device is not identified within a list, deactivating audible outputting of content of the first communication.

19. The non-transitory computer readable medium of claim 18, wherein the list includes a first list and a second list, the method further comprising:
   permitting output of content of the first communication audibly in response to determining that no person who is identified within the first list is determined to be within the pre-specified distance; and
   permitting output of content of the first communication audibly in response to determining that only one or more persons who are not the user associated with the communication terminal are identified within the second list are determined to be within the pre-specified distance.

20. The non-transitory computer readable medium of claim 19, the method further comprising:
   permitting output of content of the first communication audibly at or below a pre-specified audible level via a speaker of the communication device in response to determining that at least one person who is not the user associated with the communication device is within the pre-specified distance of and is not identified within the second list, and determining that the communication device is in the first position in which the speaker of the communication device is adjacent an ear of the user associated with the communication device.

* * * * *